(12) United States Patent
Balaur et al.

(10) Patent No.: US 11,506,881 B2
(45) Date of Patent: Nov. 22, 2022

(54) METHOD OF IMAGING AN OBJECT AND A SAMPLE HOLDER FOR USE IN AN OPTICAL MICROSCOPE

(71) Applicant: La Trobe University, Victoria (AU)

(72) Inventors: Eugeniu Balaur, Victoria (AU); Brian Abbey, Victoria (AU)

(73) Assignee: La Trobe University, Victoria (AU)

( * ) Notice: Subject to any disclaimer, the term of this patent is extended or adjusted under 35 U.S.C. 154(b) by 437 days.

(21) Appl. No.: 16/615,782

(22) PCT Filed: May 22, 2018

(86) PCT No.: PCT/AU2018/050496
§ 371 (c)(1),
(2) Date: Nov. 21, 2019

(87) PCT Pub. No.: WO2018/213881
PCT Pub. Date: Nov. 29, 2018

(65) Prior Publication Data
US 2020/0142173 A1    May 7, 2020

(30) Foreign Application Priority Data
May 22, 2017    (AU) ................................. 2017901940

(51) Int. Cl.
| | |
|---|---|
| *G02B 5/00* | (2006.01) |
| *G02B 21/34* | (2006.01) |
| *G02B 21/36* | (2006.01) |

(52) U.S. Cl.
CPC ............. *G02B 21/34* (2013.01); *G02B 5/008* (2013.01); *G02B 21/367* (2013.01)

(58) Field of Classification Search
CPC ........ G02B 5/008; G02B 21/06; G02B 21/34; G02B 21/36; G02B 21/008; B82Y 20/00;
(Continued)

(56) References Cited

U.S. PATENT DOCUMENTS

| | | | |
|---|---|---|---|
| 5,836,872 A | 11/1998 | Kenet | |
| 8,154,722 B2 * | 4/2012 | Yamada | ............... G01N 21/554 422/50 |

(Continued)

FOREIGN PATENT DOCUMENTS

| | | |
|---|---|---|
| DE | 102012214932 A1 | 2/2014 |
| EP | 2146229 A1 | 1/2010 |

(Continued)

OTHER PUBLICATIONS

Altunbay, D. et al. "Color graphs for automated cancer diagnosis and grading." IEEE Transactions on Biomedical Engineering 57.3 (2009): 665-674.

(Continued)

*Primary Examiner* — Que Tan Le
(74) *Attorney, Agent, or Firm* — Quarles & Brady LLP

(57) ABSTRACT

A system and method of imaging an object uses a plasmonic layer as a sample holder defining a periodic array of sub-micron structures adjacent the object. The sample holder is exposed to a first portion of light that is transmitted through either the plasmonic layer but not the object, or the plasmonic layer and a first section of the object, and a second portion of the light that is transmitted through the plasmonic layer and at least a second section of the object. The light interacts with at least the plasmonic layer and the first portion of the transmitted light characterizes one or more first surface plasmon resonance peaks and the second portion of the transmitted light characterizes one or more second surface plasmon resonance peaks that are wavelength shifted from the first surface plasmon resonance peaks by the object affecting plasmons propagating within the plasmonic layer.

28 Claims, 8 Drawing Sheets

(58) Field of Classification Search
CPC .. B82Y 30/00; G01N 2021/258; G01N 21/55; G01N 33/48; G06T 5/00; G06T 11/00; G06T 2207/10; G06V 20/69
USPC .................................. 250/208.1, 239, 559.4
See application file for complete search history.

(56) References Cited

U.S. PATENT DOCUMENTS

| | | |
|---|---|---|
| 2003/0096302 A1 | 5/2003 | Yguerabide |
| 2007/0178607 A1 | 8/2007 | Prober |
| 2008/0099667 A1 | 5/2008 | Stark |
| 2008/0252894 A1 | 10/2008 | Lakowicz |
| 2009/0153866 A1 | 6/2009 | Yamamichi et al. |
| 2010/0291575 A1 | 11/2010 | Shamah |
| 2012/0113424 A1 | 5/2012 | Suda et al. |
| 2014/0131559 A1 | 5/2014 | Yen et al. |
| 2014/0168651 A1 | 6/2014 | Guo |
| 2014/0206101 A1 | 7/2014 | Liu et al. |
| 2014/0327913 A1 | 11/2014 | Pacifici et al. |
| 2015/0002843 A1 | 1/2015 | Yokogawa |
| 2016/0306157 A1 | 10/2016 | Rho et al. |
| 2018/0045644 A1 | 2/2018 | Baumgold |
| 2018/0107038 A1 | 4/2018 | Chen |

FOREIGN PATENT DOCUMENTS

| | | | |
|---|---|---|---|
| EP | 2653903 | A1 | 10/2013 |
| EP | 3121587 | A1 | 1/2017 |
| JP | 2001133618 | A | 5/2001 |
| JP | 2007192806 | A | 8/2007 |
| JP | 2009222401 | A | 10/2009 |
| JP | 2009223123 | A | 10/2009 |
| JP | 2010009025 | A | 1/2010 |
| JP | 2012159792 | A | 8/2012 |
| JP | 2016212126 | A | 12/2016 |
| WO | 2005017570 | A2 | 2/2005 |
| WO | 2005114298 | A2 | 12/2005 |
| WO | 2008039212 | A2 | 4/2008 |
| WO | 2009089292 | A1 | 7/2009 |
| WO | 2011163624 | A1 | 12/2011 |
| WO | 2013089996 | A1 | 6/2013 |
| WO | 2015005904 | A1 | 1/2015 |
| WO | 2017161097 | A1 | 9/2017 |
| WO | 2018107038 | A1 | 6/2018 |
| WO | 2018152157 | A1 | 8/2018 |

OTHER PUBLICATIONS

Arora, P. et al. "Fourier plane colorimetric sensing using broadband imaging of surface plasmons and application to biosensing." Journal of Applied Physics 118.23 (2015): 233105.
Huang, F. M. et al. "Focusing of Light by a Nano-Hole Array." Presented at Frontiers in optics Conference 2006, Rochester, New York, USA Oct. 8-12, 2006.
Huang, F. M. et al. "Nanohole array as a lens." Nano letters 8.8 (2008): 2469-2472.
Jiang, J. et al. "Plasmonic nano-arrays for ultrasensitive biosensing." Nanophotonics 7.9 (2018): 1517-1531.
Schmid, P. "Segmentation of digitized dermatoscopic images by two-dimensional color clustering." IEEE Transactions on Medical Imaging 18.2 (1999): 164-171.
Wisaeng, K. et al. "Improved fuzzy C-means clustering in the process of exudates detection using mathematical morphology." Soft Computing 22.8 (2018): 2753-2764.
Wu, L., et al. (2015). Cancer biomarker detection: recent achievements and challenges. Chemical Society Reviews, 44 (10), 2963-2997.
European Patent Office, Extended Search Report, Application No. 18805420.9, dated Feb. 19, 2021, 11 pages.
China National Intellectual Property Administration, First Office Action and Search Report, Application No. 2018800496592, dated Jun. 1, 2021, 19 pages.
Carr, RJG, et al. "Submicron optical sources for single macromolecule detection." Proceedings of the SPIE, SPIE, Bellingham, VA, US, vol. 1796, Sep. 8, 1992, pp. 152-156.
Balaur, E, et al. "Continuously tunable, polarization controlled, colour palette produced from nanoscale plasmonic pixels." Scientific reports 6 (2016): 28062.
International Searching Authority, International Search Report and Written Opinion for application PCT/AU2018/050496, dated Jun. 20, 2018.
Japan Patent Office, Notice of Reasons for Refusal, Application No. 2019-565010, dated Apr. 5, 2022, 6 pages.

* cited by examiner

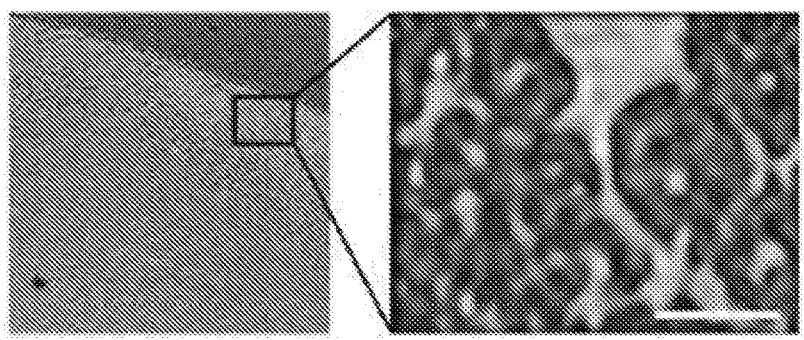
Figure 9a
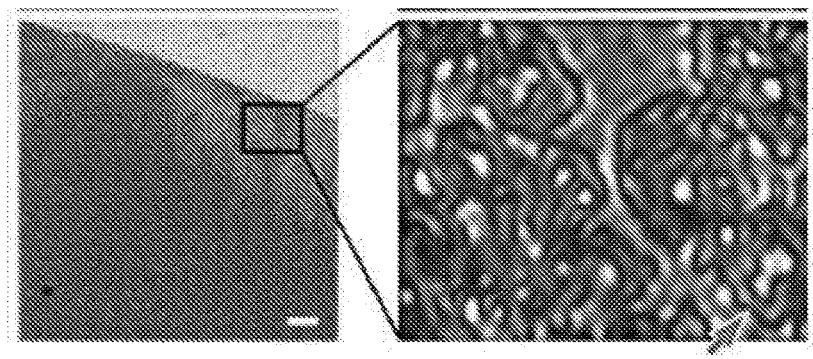
Figure 9b
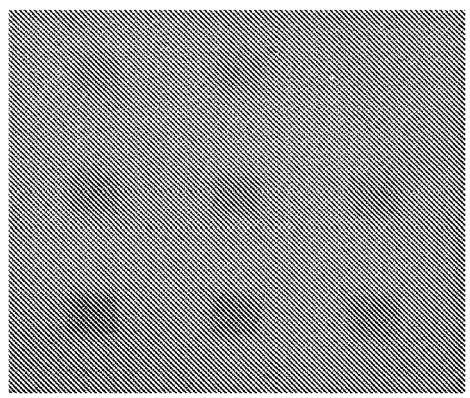 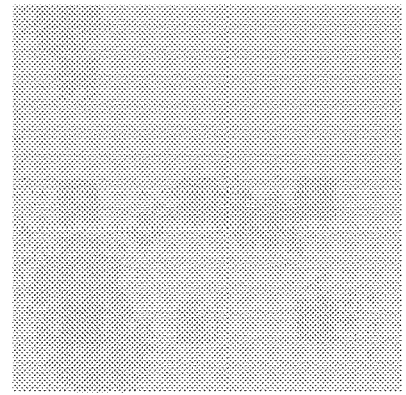
Figure 10a Figure 10b

METHOD OF IMAGING AN OBJECT AND A SAMPLE HOLDER FOR USE IN AN OPTICAL MICROSCOPE

CROSS-REFERENCE TO RELATED APPLICATIONS

This application represents the U.S. national stage entry of International Application No. PCT/AU2018/050496 filed May 22, 2018, which claims priority to Australian Patent Application No. 2017901940 filed May 22, 2017, the disclosure of which is incorporated herein by reference in its entirety and for all purposes.

TECHNICAL FIELD

The present disclosure generally relates to methods, devices and equipment for optical microscopy. More specifically, the present disclosure relates to methods of, and devices and equipment, for enhancing image contrast of samples in an optical microscope.

BACKGROUND

The application of optical microscopy to biology by Leeuwenhoek in the 17th century was a pivotal moment in the life sciences. Since then the microscope has undergone continuous development, including the introduction of the phase-contrast microscope, which made it possible to study living cells that typically do not scatter or absorb much light and may otherwise appear transparent. Phase-contrast microscopy exploits variations in the optical path length through the specimen, which is a function of both the refractive index of the material and its thickness. With the appropriate setup, interference between rays of different optical path lengths results in constructive and destructive interference which renders the phase information in the sample visible as changes in the amplitude of light.

In-spite of its great success, phase-contrast microscopy has a number of drawbacks including the potential introduction of artefacts, such as the so-called 'halo' effect where a spurious amount of light appears beyond the edge of an object being imaged. The halo effect therefore effectively reduces the spatial resolution of phase-contrast microscopy.

Another related technique used to enhance contrast in optical microscopy is differential interference contrast (DIC) imaging, developed by Georges Nomarski. DIC uses the polarisation dependent rate of change in the direction of wavefront shear combined with interference to enhance the optical path length differences within a sample. Unlike many phase-contrast microscopy techniques, DIC does not contain any diffraction halo artefacts. This method outputs a pseudo 3-D image, which resembles a structured surface, but is not an accurate representation of the sample topology.

Both phase-contrast microscopy and DIC techniques require modifications to the conventional optical microscope setup, and an experienced user to appropriately interpret the image information. Disadvantages of these techniques are that the spatial resolution may be reduced compared to conventional microscopy and the resulting images may contain artefacts.

The optical systems, which underpin the modern microscope, are capable of imaging samples at high spatial resolution by using very high numerical aperture lenses. However, for the life sciences, the issue of image contrast and specificity is still a fundamental challenge for imaging of specimens that weakly interact with light. This includes many cells and tissue samples. In a conventional bright-field microscope, the interaction of the incident light with the sample and the quality of the optical system, as well as the efficiency of the detector, dictates the contrast. This implies that contrast is not an intrinsic property of the imaged specimen but rather of the imaging system.

In optical microscopy, image contrast may be enhanced using: phase information, optical path length gradients, staining of samples or fluorescence labelling. Phase-contrast imaging in particular has become one of the primary techniques used to enhance the contrast of sample features that are too weakly interacting with light to detect using conventional microscopy.

When phase contrast or DIC imaging is not available or produces artefacts, staining is usually used in order to increase the contrast. In this case, the image contrast is enhanced as a result of light absorption by pigments introduced into the specimen. The disadvantage of this technique is the possibility of sample damage, introduction of artefacts and inability to image live samples.

Therefore, there is a need to develop high-contrast, label-free imaging techniques to image unstained, fluorescence-free samples using conventional optical setups.

Any discussion of documents, acts, materials, devices, articles or the like, which has been included in the present specification, is not to be taken as an admission that any or all of these matters: form part of the prior art base; were common general knowledge in the field relevant to the present disclosure as it existed before the priority date of each claim of this application; or could have been understood, regarded as relevant or reasonably expected to have been combined by a person skilled in the art.

SUMMARY

In a first aspect of the present disclosure, there is provided a method of imaging an object. The method includes:

supporting the object on a plasmonic layer of a sample holder, wherein the plasmonic layer defines a periodic array of sub-micron structures adjacent the object;

exposing the sample holder to light such that:
a first portion of the light is transmitted through either the plasmonic layer but not the object, or the plasmonic layer and a first section of the object, and
a second portion of the light is transmitted through the plasmonic layer and at least a second section of the object;

wherein the light interacts with at least the plasmonic layer such that:
the first portion of the transmitted light is characterised by one or more first surface plasmon resonance peaks, and
the second portion of the transmitted light is characterised by one or more second surface plasmon resonance peaks that are wavelength shifted from the first surface plasmon resonance peaks as a result of the object affecting plasmons propagating within the plasmonic layer; and constructing an image of the object from the first and the second portions of the transmitted light to thereby enable the object to be spatially resolved.

In some embodiments, the method further includes analysing the image to spatially resolve the object.

The light may have plurality of wavelengths in the range of 200 nm to 900 nm. In some embodiments, at least one of the first and the second surface plasmon resonance peaks have a peak intensity at a wavelength in the range of 300 nm to 800 nm.

The sub-micron structures may be arranged in a periodic array with a separation between the sub-micron structures in the range of 200 nm to 500 nm. The sub-micron structures may have a largest dimension in the range of 50 nm to 300 nm.

In some embodiments, the sub-micron structures are apertures through the plasmonic layer. The apertures may be shaped as any one or more of: a circle, a torus, an ellipse, a cross, and a shape including a plurality of intersecting elongate arms. There may be an angle between adjacent elongate arms is in the range of 30° to 90°.

The method may further include exposing the sample holder and the object to polarised light.

In further embodiments, the polarised light is linearly polarised at a first polarisation angle with respect to a first axis of the periodic array of apertures, the periodic array having a first spacing of the sub-micron structures along the first axis that is different to a second spacing of sub-micron structures along a second axis, and the second axis being oriented at an angle to the first axis. The method may also further include exposing the sample holder and object to linearly polarised light at a second polarisation angle with respect to the first axis.

In some embodiments the method is performed with an optical microscope.

The plasmonic layer may be formed from one or more metals selected from any one of: Al, Ag, Au, Ni, Pt and Pd. The plasmonic layer may have a thickness in the range of 20 nm to 300 nm.

The sample holder includes a substrate connected to at least a portion of a first surface of the plasmonic layer to provide mechanical support for the plasmonic layer. The substrate may be optically clear such that optical transmission through the substrate is greater than zero and the substrate chemically isolates the first surface.

In some embodiments, the sample holder includes an optically clear protective layer bonded to a second side of the plasmonic layer to isolate the plasmonic layer. The optically clear protective layer may have a thickness less than 150 nm. In some embodiments the optically clear protective layer may have a thickness less than 80 nm. The optically clear protective layer may include any one or more of: silicon oxide, silicon nitride, transparent metal oxide, and a polymer.

In a second aspect of the present disclosure, there is provided a sample holder for use in an optical microscope. The sample holder includes a plasmonic layer defining a periodic array of sub-micron structures, wherein the sample holder and plasmonic layer are configured to:

support an object such that the array of sub-micron structures is adjacent the object when supporting the object; and enable light to be transmitted through the plasmonic layer, wherein the light interacts with at least the plasmonic layer such that spectra from the transmitted light includes:
  a first portion characterised by one or more first surface plasmon resonance peaks, and
  a second portion characterised by one or more second surface plasmon resonance peaks that are wavelength shifted from the first surface plasmon resonance peaks as a result of the object affecting plasmons propagating within the plasmonic layer, thereby enabling an image of the object to be constructed from the transmitted light and the object to be spatially resolved from the image.

The plasmonic layer may be configured to produce at least one surface plasmon resonance peak with a peak intensity at a wavelength in the range of 300 nm to 800 nm.

The sub-micron structures may be arranged in a periodic array with a separation between the sub-micron structures in the range of 200 nm to 500 nm. The sub-micron structures may have a largest dimension in the range of 50 nm to 300 nm.

In some embodiments, the sub-micron structures are apertures through the plasmonic layer. The apertures may be shaped as any one or more of: a circle, a torus, an ellipse, a cross, and a shape including a plurality of intersecting elongate arms. There may be an angle between adjacent elongate arms is in the range of 30° to 90°.

The plasmonic layer may be formed from one or more metals selected from any one of: Al, Ag, Au, Ni, Pt and Pd. The plasmonic layer may have a thickness in the range of 20 nm to 300 nm.

The sample holder includes a substrate connected to at least a portion of a first surface of the plasmonic layer to provide mechanical support for the plasmonic layer. The substrate may be optically clear such that optical transmission through the substrate is greater than zero and the substrate chemically isolates the first surface.

In some embodiments, the sample holder includes an optically clear protective layer bonded to a second side of the plasmonic layer to isolate the plasmonic layer. The optically clear protective layer may have a thickness less than 150 nm. In some embodiments the optically clear protective layer may have a thickness less than 80 nm. The optically clear protective layer may include any one or more of: silicon oxide, silicon nitride, transparent metal oxide, and a polymer.

In a third aspect of the present disclosure, there is provided a sample holder according to any one of the embodiments of the second aspect claims, when used in the optical microscope to perform the method according to the first aspect.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments are described in further detail below, by way of example, with reference to the accompanying drawings briefly described below:

FIG. 9a is a bright-field microscopy image with 0° linearly polarised light of myelin sheath supported on a sample holder according to an embodiment, and a close up image of a portion of the image;

FIG. 9b is a bright-field microscopy image with 90° linearly polarised light of the same myelin sheath shown in FIG. 9a on the sample holder of FIG. 9a, and a close up image of a portion of the image;

FIG. 10a is a bright-field microscopy image of an ion-implanted thin film supported on a sample holder according to an embodiment;

FIG. 10b is a bright-field microscopy image of an ion-implanted thin film supported on a conventional microscope slide;

DETAILED DESCRIPTION

The present disclosure generally relates to methods, devices and equipment for optical microscopy. More specifically, the present disclosure relates to methods of, and devices and equipment, for enhancing image contrast of samples in an optical microscope.

Some embodiments relate to methods and devices for microscopy using a modified sample holder, such as a microscope slide. These methods and devices may advantageously provide significant image contrast enhancement while enabling features to be spatially resolved and without the use of any stains or fluorescent markers.

Figure 1A:
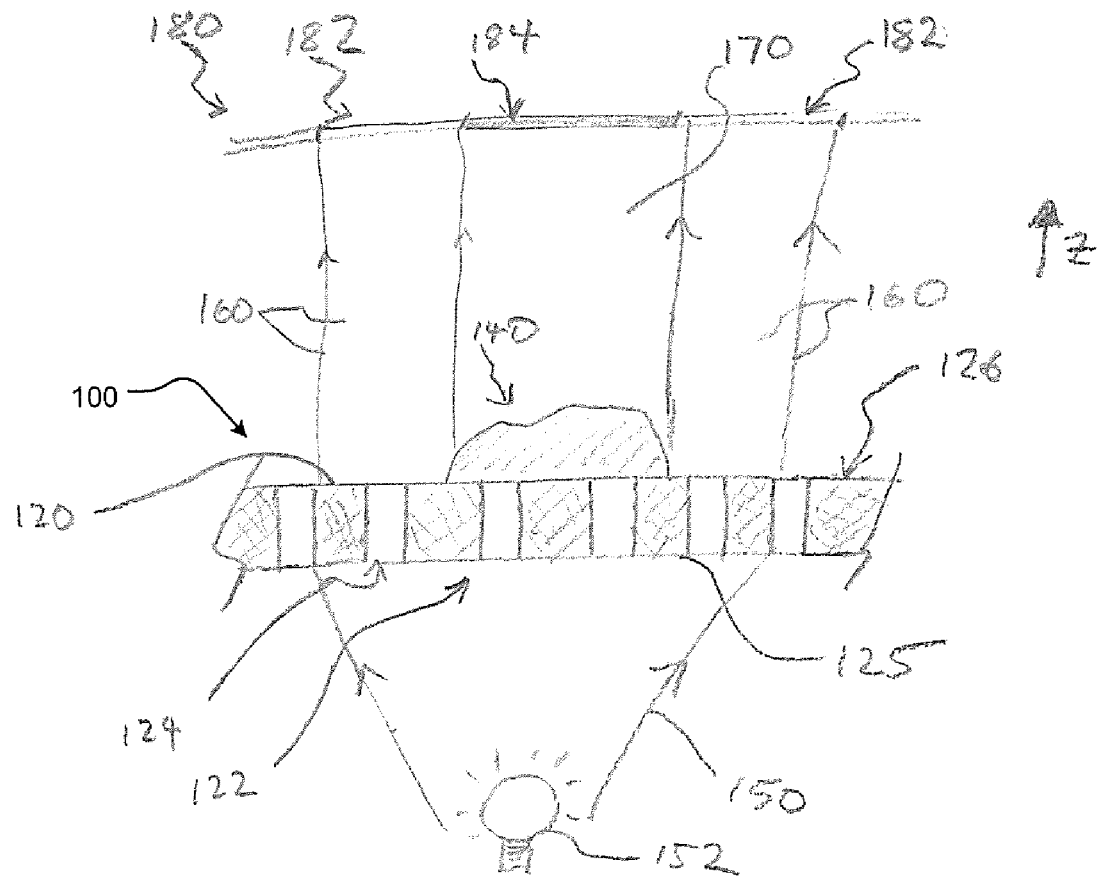
FIG. 1a is a side cross-sectional view of a sample holder for supporting an object being imaged, according to some embodiments.
Figure 1B:
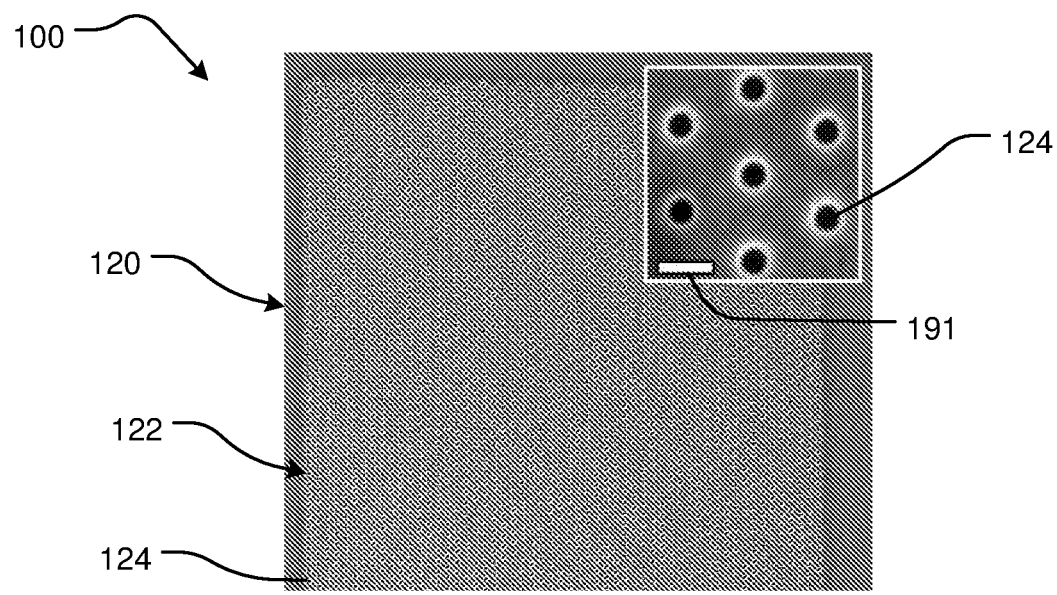
FIG. 1b is a top view of a section of the sample holder of FIG. 1a, and an inset image showing a close up of an array of sub-micron structures or apertures of a plasmonic layer of the sample holder.

Referring to FIGS. 1a and 1b, a sample holder 100 for use in a microscope (not shown) is provided. The sample holder 100 includes a plasmonic layer 120 defining a periodic array 122 of sub-micron sized structures 124, wherein the sample holder 100 and plasmonic layer 120 are configured to support an object 140 such that the array 122 of sub-micron structures 124 is adjacent the object 140.

In some embodiments, the sample holder 100 comprises the plasmonic layer 120 defining a periodic array 122 of sub-micron sized structures 124 and the sample holder 100 is configured to support an object 140 such that the array 122 of sub-micron structures 124 of the plasmonic layer 120 is adjacent the object 140. For example the plasmonic layer 120 may be configured to support the object 140.

In some embodiments, at least a portion of the plasmonic layer 120 is a free-standing or self-supporting film and the sample holder 100 may include a frame to support other portions of the plasmonic layer 120.

A light source 152 is used to produce light 150 that the sample holder 100 is exposed to. The sample holder 100 and plasmonic layer 120 are configured to enable light 150 that is incident on the plasmonic layer 120 to be transmitted through the sample holder 100 and plasmonic layer 120 such that the transmitted light 160 is characterised by a spectrum 200 (FIG. 2A) with one or more intrinsic surface plasmon resonance peaks 220. The resulting spectrum 200 of the transmitted light 160 may show one or more intrinsic surface plasmon resonance peaks 220 that are characteristic of properties of the sample holder 100 and/or plasmonic layer 120, as described in more detail below.

In some embodiments, the sample holder 100 is configured to enable light 150 that is incident on the plasmonic layer 120 to be transmitted through the sample holder 100 and plasmonic layer 120. For example the sample holder 100 may include a frame defining a window or aperture, or an optically clear substrate 410, as described in more detail below.

The incident light 150 may propagate in a longitudinal direction Z perpendicular to a lateral plane (not shown) that the plasmonic layer 120 extends over.

The periodic array 122 may, for example, be a triangular, rectangular or square array. The triangular periodic array may give the appearance of a hexagonal array. The separation between each sub-micron structure 124 is optionally in the range of 200 nm to 500 nm.

In some embodiments, the sub-micron structures 124 are apertures through the plasmonic layer 120. The apertures may have a largest opening in the range of 50 nm to 300 nm. The apertures may be shaped as any one or more of: a circle, an ellipse, a torus, a square, a rectangle, a cross, and a polygon. For example, the scale bar 191 of the inset image in FIG. 1b may be 300 nm and the circular apertures may have a diameter of 160 nm.

The array 122 of apertures 124 may be formed in the plasmonic layer 120 with any one of: a focused ion-beam, photolithography and chemical etching, or electron-beam lithography and chemical etching, or nanoimprint based techniques using a template.

Light propagation through periodic arrays of subwavelength nano-scaled apertures may be explained by Extraordinary Optical Transmission. Extraordinary Optical Transmission may occur at wavelengths of incident light 150 equal to or longer than the size of the aperture. This phenomenon may be explained by surface plasmon polariton propagation in the plasmonic layer 120.

The sub-micron structures 124 may also include rough surfaces, nano-particles, pillars and gratings. The sub-micron structures may be isolated by and/or separated by a distance smaller than or equal to the wavelength of the light 150. Incident light 150 with wavelengths that are equal to or longer than the size of the sub-micron structures 124 may lead to propagation of surface plasmon polaritons in the plasmonic layer 120, as discussed in more detail below.

Figure 2:
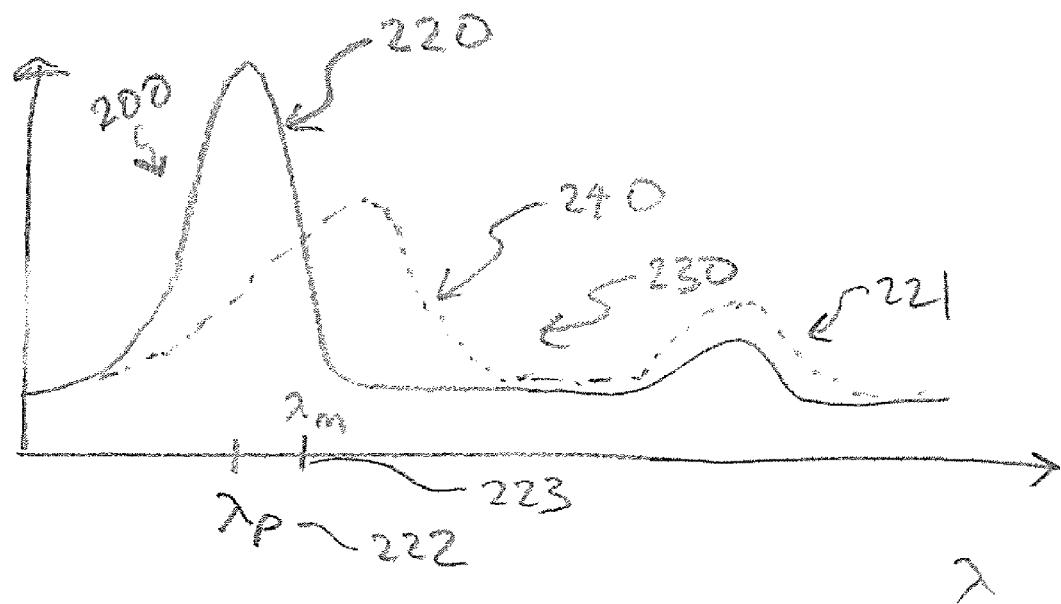
FIG. 2 is a plot of spectra including surface plasmon resonance peaks.

The spectrum 200 shown in FIG. 2 illustrates how the intensity of transmitted light 160 depends on the wavelength $\lambda$ of the transmitted light 160. Each intrinsic surface plasmon resonance peak 220 may be defined by a resonant wavelength $\lambda_P$ 222. The resonant wavelength $\lambda_P$ 222 of the surface plasmon resonance peak 220 may be taken as the wavelength corresponding to the maximum intensity of the intrinsic surface plasmon resonance peak 220. Alternatively, the resonant wavelength $\lambda_P$ 222 of the surface plasmon resonance peak 220 may be the central wavelength between the wavelengths at half the maximum intensity of the intrinsic surface plasmon resonance peak 220.

The intrinsic surface plasmon resonance peaks 220 are the result of resonant interaction of the incident light 150 with the collective oscillations of free electrons at a surface 125, 126 of the plasmonic layer 120. This leads to propagating excitations or surface plasmons known as surface plasmon polaritons. The resonant wavelength $\lambda_P$ 222 (and respective resonant frequency) of surface plasmon polaritons strongly depends on the surface composition and structure of the plasmonic layer 120.

The wavelengths of the intrinsic surface plasmon resonance peaks 220 may also depend on sample holder parameters such as the dielectric constant of the plasmonic layer 120, the configuration of the array 122 and the sub-micron structures or apertures 124. For example, the spacing and size of the apertures (as discussed further below) may affect the wavelength of the intrinsic resonance peaks 220. The intrinsic resonance peaks 220 are therefore characteristic of the configuration of the sample holder 100 and/or plasmonic layer 120.

In some embodiments, the plasmonic layer 120 is configured to produce at least one intrinsic plasmon resonance peak 220 with wavelengths in the range of 200 nm to 900 nm. At least some of the transmitted light 160 is therefore visible as it includes wavelengths in the visible spectrum.

The dielectric constant of the plasmonic layer 120 may be predetermined by forming the plasmonic layer 120 from a particular material. In some embodiments, the plasmonic layer 120 is formed from one or more metals selected from the group of: Al, Ag, Au, Ni, Pt and Pd. The plasmonic layer 120 may have a thickness in the range of 20 to 300 nm. Some of the incident light 150 may be transmitted directly through the plasmonic layer 120 depending on the material used and the wavelength of light. This may be undesirable as it may contribute to background light which reduces any image contrast enhancement provided by the plasmonic layer 120.

When the plasmonic layer 120 is formed from a metal, the metal plasmonic layer 120 may be deposited onto a substrate (such as a clear substrate 410 described below) using a physical deposition method such as, but not limited to, sputtering, thermal evaporation or electron-beam evaporation.

The electromagnetic field of surface plasmon polaritons also exists external to and beyond the surface 126 of the plasmonic layer 120. The component of the electromagnetic field normal to the surface 126 decays exponentially in a direction Z normal to the surface 126 of the plasmonic layer 120 as shown in FIG. 1. As a result, the environment in the vicinity adjacent to the plasmonic layer 120 can also affect the production of surface plasmon polaritons, intrinsic resonance peaks 220 and therefore the resonant wavelength $\lambda_P$ 222. Surface plasmon polaritons are, for example, sensitive to differences in the refractive index or dielectric constant of the environment adjacent to the array 122 of sub-micron structures 124 in the plasmonic layer 120.

As illustrated in FIG. 1a, the plasmonic layer 120 defines a first surface 125 and a second surface 126. The second surface 126 may be a reverse surface of the first surface 125. The first surface 125 and second surface 126 may be major surfaces of the plasmonic layer 120. If the dielectric constant of the environment adjacent to each surface 125, 126 is different, the spectrum 200 from light transmitted through the plasmonic layer 120 may also include another intrinsic surface plasmon resonance peak 221 corresponding to light generating plasmons at the first surface 125.

Object 140 can also affect surface plasmon propagation when object 140 is placed adjacent to the plasmonic layer 120. When object 140 is close enough to the plasmonic layer 120 to affect surface plasmon propagation in the plasmonic layer 120, light 170 that is transmitted through the plasmonic layer 120 and the object 140 is characterised by a second spectrum 230 (FIG. 2). For example, the electromagnetic field generated by the surface plasmon polaritons in the plasmonic layer 120 exhibits an exponential decay in a direction Z away from the plasmonic layer 120. Therefore, an object 140 may still affect surface plasmon propagation in the plasmonic layer 120 further from the plasmonic layer 120 but to a lesser degree. As an example, an object 140 that is metallic may be up to 100 nm away from the second surface and still detectably affect surface plasmon propagation in the plasmonic layer 120 and the surface plasmon resonance peak 220, 221.

As shown in FIG. 2, the second spectrum 230 includes one or more second surface plasmon resonance peaks 240 that are wavelength shifted from the intrinsic surface plasmon resonance peaks 220 as a result of the object 140 affecting surface plasmons propagating within the plasmonic layer 120.

The second surface plasmon resonance peaks 240 may have a lower intensity compared to the intrinsic surface plasmon resonance peaks 220.

The intensity of light for the intrinsic surface plasmon resonance peak 221 corresponding to light generating plasmons at the first surface 125 may also increase as a result of the object 140 being placed adjacent to the second surface 126.

An image 180 of the object 140 (FIG. 1a) can be constructed from the transmitted light 160, 170 since the spectrum 220 of the first portion of transmitted light 160 may be different from the spectrum 230 of the second portion of transmitted light 170. This difference between the spectra 200, 230 appears as image contrast. Construction of image 180 is described in further detail below.

Figure 3:
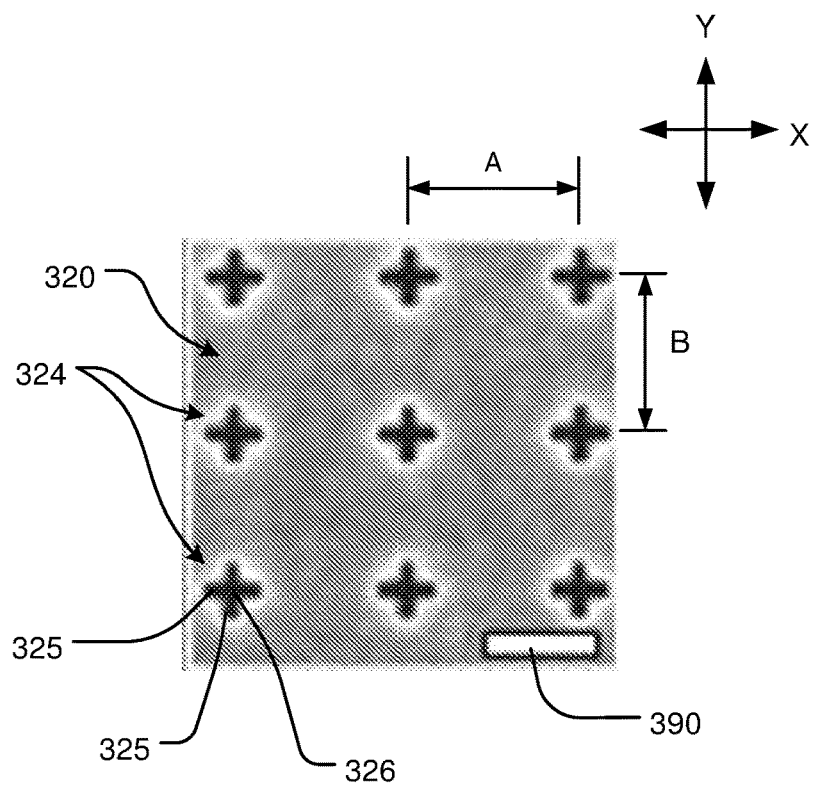
FIG. 3 is a top view of a section of a sample holder, according to some embodiments.

Referring to FIG. 3, in some embodiments, the plasmonic layer 120, 320 defines a periodic array of cross-shaped apertures 324. The apertures 324 may be described as a shape defining a plurality of intersecting elongate arms 325 extending from a central aperture 326. Each arm 325 is oriented such that there is an angle between adjacent arms 325. The angle between adjacent arms 325 is optionally in the range of 30° to 90°. In some embodiments, where the aperture 324 is shaped as a cross the angle may be 90°. In embodiments where the aperture 324 includes 8 elongate arms, the angle may be 45°. The apertures 324 have a largest opening in the range of 100 nm to 300 nm. For example, a scale bar 390 shown may be 300 nm and the largest opening of the cross may be 160 nm. Advantageously, a cross shaped aperture 324 may produce surface plasmon resonance peaks 220, 221, 240 that are sharper than surface plasmon resonance peaks 220, 221, 240 obtained from circular apertures. This may result in greater image contrast and therefore detection sensitivity to objects 140 that lead to a small wavelength shift that is less than the width of the surface plasmon resonance peaks 220, 221, 240. For example, objects that are less than 10 nm thick or sections of objects that have similar refractive indices may lead to small wavelength shifts.

The periodic array of apertures 324 may have a first spacing A along a first axis X that is different to a second spacing B along a second axis Y. The periodic array may therefore be described as an asymmetric array. The second axis is oriented at an angle to the first axis. The angle may, for example, be in the range of 30° to 90°. In some embodiments, the periodic array is a rectangular array. In an embodiment, the first spacing A is 400 nm and the second spacing B is 350 nm.

Figure 4:
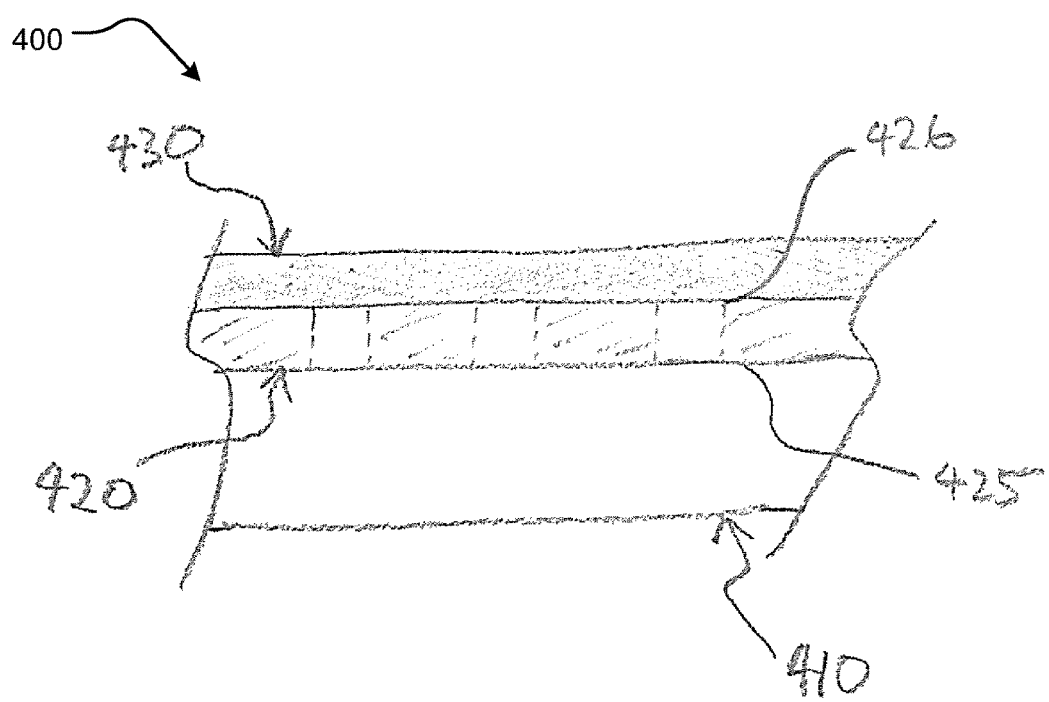
FIG. 4 is a side view of a sample holder, according to some embodiments

Referring to FIG. 4, in some embodiments, sample holder 100, 400 also includes an optically clear substrate 410 connected to the first surface 125, 425 of the plasmonic layer 120, 420 to provide mechanical support for the plasmonic layer 120, 420. The substrate 410 may chemically and physically isolate the first surface 425. The optically clear substrate 410 enables light 150 to pass therethrough to the plasmonic layer 120, 420 with an optical transmission (e.g. transmittance) that is greater than zero percent. The optically clear substrate 410 transmits sufficient light to produce propagating surface plasmons within the plasmonic layer 120, 420. In some embodiments, the optical transmission through the substrate 410 is at least 50%.

The substrate 410 may be formed from a material chosen from one of: a silicon-dioxide based glass, quartz, sapphire, transparent metal oxide, or a polymer.

In some embodiments, the substrate 410 may define windows (not shown) to expose the first surface 125, 425 of the plasmonic layer 120, 420 and enable light 150 to pass through the windows to interact with the plasmonic layer 120, 420. In these embodiments, the substrate 410 may not necessarily be formed from an optically clear material, and the substrate 410 may not necessarily be exposed to light 150. The substrate 410 may therefore be connected to at least a portion of the first surface 425 of the plasmonic layer 120, 420.

The sample holder 100, 400 may be shaped so that it can be readily used for imaging in a conventional optical microscope. The sample holder 100, 400 may, for example, take the form of a microscope slide.

In some embodiments, sample holder 100, 400 further includes an optically clear protective layer 430 coupled or bonded to a second surface 126, 426 of the plasmonic layer 120, 420. The optically clear protective layer 430 allows light 160, 170 to be transmitted therethrough and also chemically isolates the plasmonic layer 120, 420. This advantageously assists in protecting the plasmonic layer 120, 420 and allows the sample holder 100, 400 to be cleaned and reused. The optically clear protective layer 430 allows light for at least one of the surface plasmon resonance peaks 220 to be transmitted therethrough.

The optically clear protective layer 430 may include any one or more of: a silicon based oxide (e.g. $SiO_2$), silicon nitride (e.g. $Si_3N_4$), transparent metal oxide, and a polymer. The optically clear protective layer 430 may be formed with coating methods routinely used in the semiconductor industry for producing uniform thin films. For example, the optically clear protective layer 430 may be formed from a liquid precursor such as Hydrogen Silsesquioxane, which is a 'spin-on glass'. In this technique, the liquid precursor is deposited on the plasmonic layer 120, 420 and then the sample holder 100, 400 is rapidly rotated so that the liquid precursor forms a uniform thin film. The liquid precursor is then hardened using one or more of electron beams, UV-light and heating. Alternatively, the optically clear protective layer 430 may be deposited using a chemical vapour deposition method. The optically clear protective layer 430 generally does not include any native oxides that may form on the plasmonic layer 120, 420.

In some embodiments, the optically clear protective layer 430 has a thickness less than about 150 nm. The thicker the optically clear protective layer 430 is, the greater the wear resistance provided. However, as discussed earlier, the electric field of the surface plasmons decays exponentially. Therefore, the effect of the object 140 on the surface plasmon production is reduced the further the object 140 is from surface 126. The wavelength shift and therefore the image contrast may therefore be lower for thicker optically clear layers 430. The optically clear protective layer 430 may have a thickness in the range of 0.5 nm to 150 nm. For optically clear protective layers 430 formed from amorphous silicon-dioxide the thickness may be less 80 nm to produce enhanced image contrast in the visible spectrum.

In some embodiments, the sample holder 100, 400 may be treated using any conventional method know in the art to facilitate adhesion of the object 140 to the sample holder. In some examples, this may comprise using any one or more of an adhesive, a permeable protective film, plasma treatment or ultra-violet light exposure.

Figure 5:
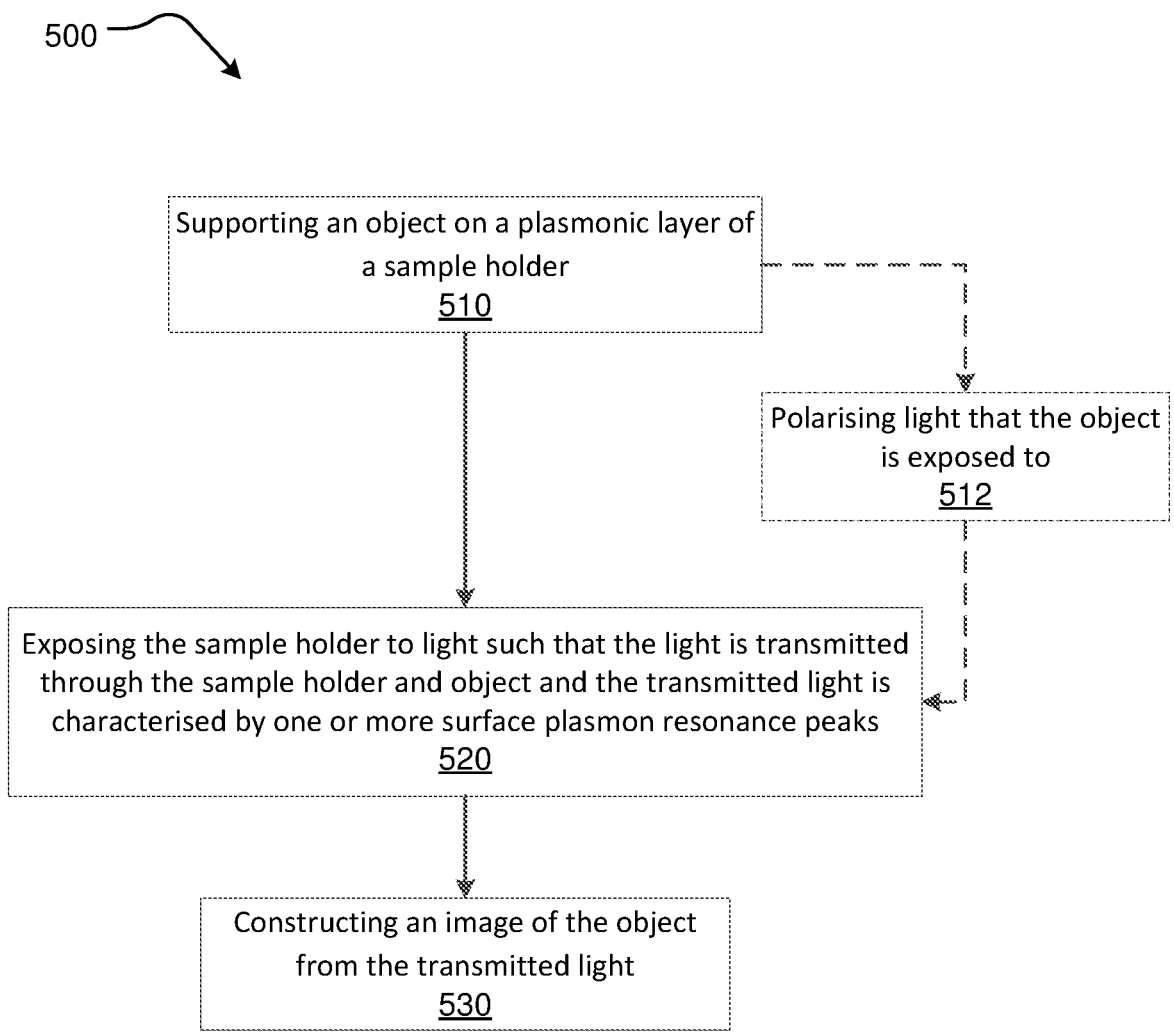
FIG. 5 is a flowchart for a method of imaging an object, according to some embodiments.

Referring to FIG. 5, a method of imaging an object 500 is shown, according to some embodiments. The method 500 includes or comprises, at 510, supporting the object 140 (FIG. 1a) on a plasmonic layer 120, 420 of a sample holder 100, 400 (FIGS. 1a & 4). As described above, the plasmonic layer 120, 420 defines a periodic array 122 of sub-micron structures 124 arranged to be adjacent the object 140 when the object 140 is supported.

The method 500 also includes, at 520, exposing the sample holder 100, 400 to light 150 such that a first portion 160 of the light is transmitted through the plasmonic layer 120, 420 but not the object 140, and a second portion 170 of the light is transmitted through the plasmonic layer 120, 420 and the object 140. The first portion 160 of light interacts with the plasmonic layer 120, 420 such that the first portion 160 of the light is characterised by one or more intrinsic (first) surface plasmon resonance peaks 220. The second portion 170 of light interacts with the plasmonic layer 120, 420 and at least a portion of the object 140 and is characterised by one or more second surface plasmon resonance peaks 240 that are wavelength shifted from the intrinsic surface plasmon resonance peaks 220 as a result of the object 140 affecting plasmons propagating within the plasmonic layer 120, 420.

Accordingly, by exposing the plasmonic layer 120, 420 to light 150, propagating surface plasmons are produced at the plasmonic layer 120, 420 as a result of surface plasmon resonance.

The method further includes, at 530, constructing an image 180 of the object 140 from the first portion 160 and the second portion 170 of the transmitted light to thereby enable the object 140 to be spatially resolved. The object 140 can be spatially resolved from the image because transmitted light 170 through the object 140 is wavelength shifted and therefore appears different to transmitted light 160 that has been transmitted through the plasmonic layer 120 but not the object 140. Therefore, image contrast is created between first regions 182 of the image 180 derived from transmitted light 160 and second regions 184 of the image 180 derived from transmitted light 170.

Figure 7A:
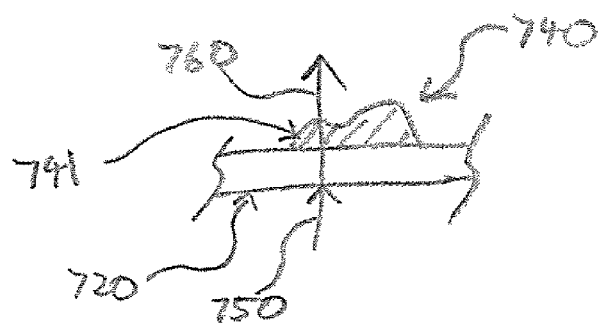
FIG. 7a is a side cross-sectional view of a sample holder supporting an object showing a first portion of light, according to some embodiments.
Figure 7B:
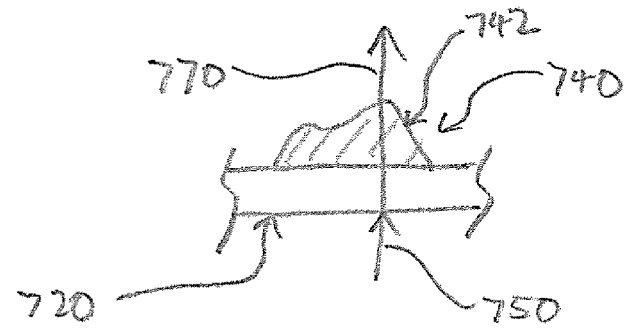
FIG. 7b is a side cross-sectional view of the sample holder and object of FIG. 7a showing a second portion of light.

Referring to FIGS. 7a to 7b, in some embodiments, a non-uniform object 740 may be imaged. Different features of the object 140 may also be spatially resolved from image 180. The first portion of light 760 in these embodiments, is transmitted through the plasmonic layer 720 and a first section 741 of the object 740. The second portion of light 770 may be transmitted through the plasmonic layer 720 and a second section 742 of the object 740. If the first section 741 and second section 742 of the object 740 affect surface plasmon resonance differently, this can lead to different surface plasmon resonance peaks 220, 221, 240 (FIG. 2) and therefore an image contrast between the first portion of light 760 and the second portion of light 770 to enable the different features of the object to be spatially resolved.

In some embodiments, the object 740 may completely cover the periodic array (not shown) defined by plasmonic layer 720. In some embodiments, the object 740 may only partially cover the periodic array (not shown) defined by plasmonic layer 720

In some embodiments, constructing image 180 (FIG. 1*a*) may comprise projecting the transmitted light from the first portion 160 and the second portion 170 onto an image plane (not shown) using lenses such as those used in optical microscopes. The image plane may be located at a sensor or detector such as a camera or human eye. Advantageously, the image 180 of object 140 may be constructed in a bright-field mode of imaging, which is used in conventional optical microscopy. Therefore, specialised sample preparation such as staining, specialised microscopes, specialised microscope components or specialised image analysis is not required to provide image contrast enhancement. Advantageously, image 180 may also be obtained using a wide field of view so that the object 140 need not be scanned to produce images over large areas. Provided that the imaging system can optically resolve the features of interest in image 180, there is no limit to the size of the array 122 and object 140 to be imaged.

If the transmitted light 160, 170 is in the visible range of wavelengths, the image contrast may appear as a contrast in colour. In some embodiments, method 500 may also include analysing the image 180. For example, transmitted light 160, 170 may also be filtered so that image contrast appears as an intensity contrast. This filtering may be performed by analysing the spectra of image 180 using image processing software.

Image analysis may also be used to determine the resonant wavelength or the wavelength shift from object 140. This may enable calculation of unknown parameters of the object 140 to be determined. For example, if the dielectric constant of the object 140 is known, the wavelength shift may be used to determine the thickness of the object 140 provided it is smaller than the evanescent length range (for example, up to 400 nm).

In some embodiments, the image 180 of the object 140 may be obtained by exposing plasmonic layer 120, 420 to incident light 150 that includes an unfiltered range of wavelengths λ. The incident light 150 may, for example, be produced by light source 152 that is considered a white light source. Alternatively, image 180 may be obtained by exposing plasmonic layer 120, 420 to monochromatic incident light 150.

Advantageously, imaging with unfiltered light may provide enhanced image contrast compared to using monochromatic light of wavelength $\lambda_m$ 223 or a narrow band of light near wavelength $\lambda_m$ 223. For example, referring to FIG. 2, the intensity of transmitted light 170 from the object 140 as seen in the wavelength shifted spectrum 230 is the same as the intensity of transmitted light 160 that only passed through the plasmonic layer 120, 420. Therefore, no image contrast would be observed from object 140 in image 180 if imaging was performed using light of wavelength $\lambda_m$.

If, however, imaging were performed using the resonant wavelength $\lambda_P$ 222 and no other resonance peaks of similar intensity were present in spectrum 200, any wavelength shift in the plasmon resonance peak 220 may result in a change in intensity to produce regions showing image contrast.

Transmitted light 170 may also be affected by interactions with the object 140 such as scattering, dispersion and absorption. Thicker objects may therefore transmit light 170 with a lower intensity as in conventional microscopy. However, image contrast is enhanced as a result of the wavelength shift due to the object 140 interacting with surface plasmon polaritons generated in the plasmonic layer 120, 420. Thicker objects may therefore produce increased image contrast due to wavelength shifted and lower intensity transmitted light 170 due to a combination of plasmonic effects, scattering, dispersion and absorption.

The wavelength shift, however, may be independent of light-object interactions such as scattering, dispersion and absorption. This advantageously enables imaging of objects 140 that only weakly interact with light and would otherwise be transparent or very difficult to observe using conventional optical microscopy. Put another way, method 500 exploits the change in colour to achieve image contrast enhancement.

Figure 8A:
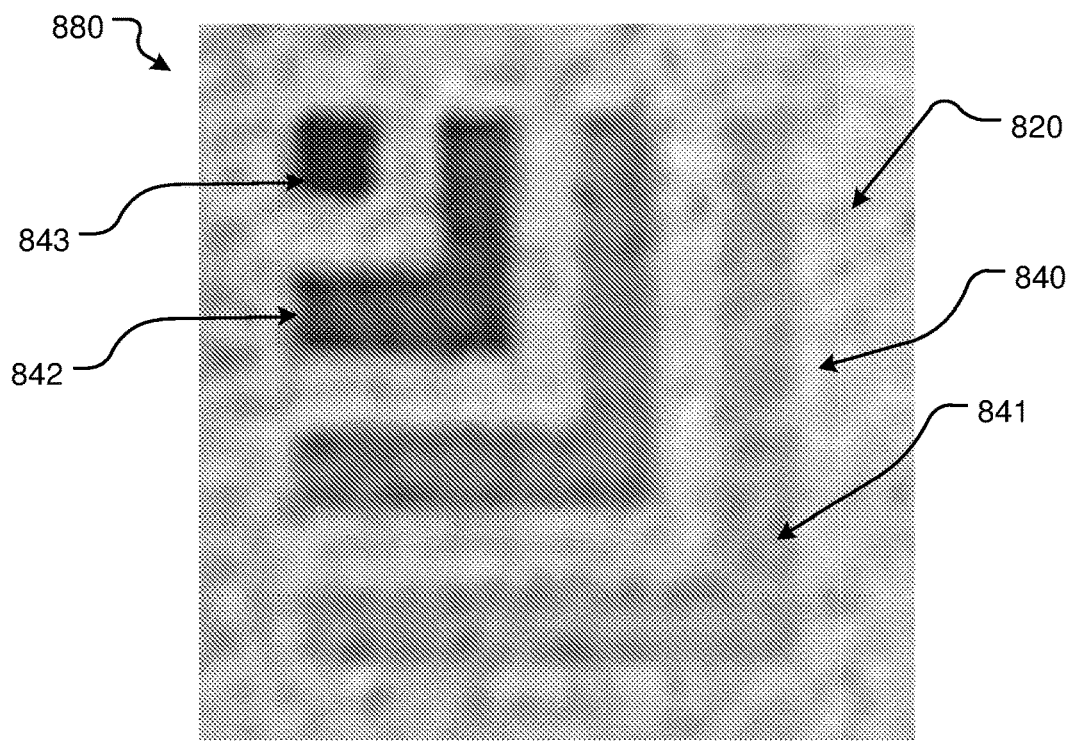
FIG. 8a is a top-view bright-field microscopy image with 0° linearly polarised light of objects supported on a sample holder according to an embodiment.
Figure 8B:
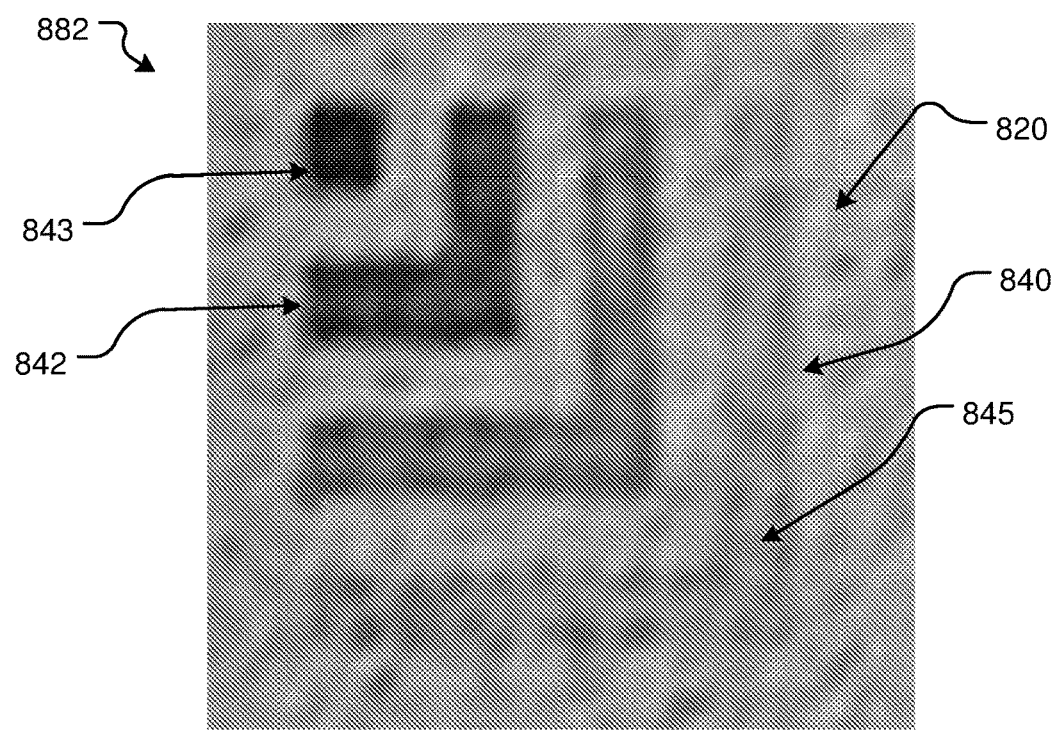
FIG. 8b is a top-view bright-field microscopy image with 90° linearly polarised light of the objects supported on the sample holder of FIG. 8a, according to an embodiment.

In some embodiments, method 500 further includes linearly polarising light 150 at a first polarisation angle, at 512. The method 500 may also include exposing a sample holder 100, 400 (including plasmonic layer 320, 820) and an object 140, 840 to linearly polarised light 150 (see FIGS. 8*a* & 8*b*). As described herein, the plasmonic layer 320 defines a periodic array of apertures 124, 324 having a first spacing A along the first axis that is different to a second spacing B along a second axis, the second axis being oriented at an angle to the first axis. The light is linearly polarised at a first polarisation angle with respect to the first axis, and the image 180, 880 that is constructed from exposing the sample holder 100, 400 and object 140, 840 to linearly polarised light 150 at the first polarisation angle may be recorded. The method 500 may then be repeated by exposing the sample holder 100, 400 and object 140,840 to light 150 linearly polarised at a second polarisation angle with respect to the first axis. The second polarisation angle may, for example be aligned with the second axis. The image 180, 882 (FIG. 8*b*) constructed from exposure to linearly polarised light 150 at the second polarisation angle may also be recorded.

Advantageously, images 180, 880, 882 constructed from exposing sample holder 100, 400 including plasmonic layer 320, 820 and object 140, 840 to light 150 linearly polarised at different polarisation angles with respect to the first axis may produce different images 180, 880, 882 due to different wavelength shifts leading to different image contrast conditions. For example, object 140, 840 seen in region 841 of image 880 with 0° linearly polarised light in FIG. 8*a* appears orange. However, the same object 140, 840 seen in region 845 of image 882 with 90° linearly polarised light in FIG. 8*b* appears yellow. Therefore, method 500 may be used to advantageously obtain additional information from the object 140 that may not be readily obtainable from conventional optical imaging methods. The effect of changing the polarisation angle on the image contrast is less pronounced in the progressively thicker objects 842, 843.

The different images 880, 882 obtained at different polarisation angles result from the polarised light interacting with the plasmonic layer 120, 420, 820 and the object 140, 840 differently due to the first spacing A being different to the second spacing B. When the polarisation angle is aligned with the first axis, the surface plasmon resonance is dependent on the second spacing B. When the polarisation angle is aligned with the second axis, the surface plasmon resonance is dependent on the first spacing A. A polarisation angle oriented in between the first and second axis is dependent on both first and second spacings A, B.

In some embodiments, the method 500 further includes circularly or elliptically polarising light 150 to expose the sample holder 100, 400 and the object 140, 840 to. The array of sub-micron structures 124, 324 may be configured to produce different surface plasmon resonances depending on whether the polarisation is right or left handed (clock-wise or anti clock-wise).

Figure 6A:
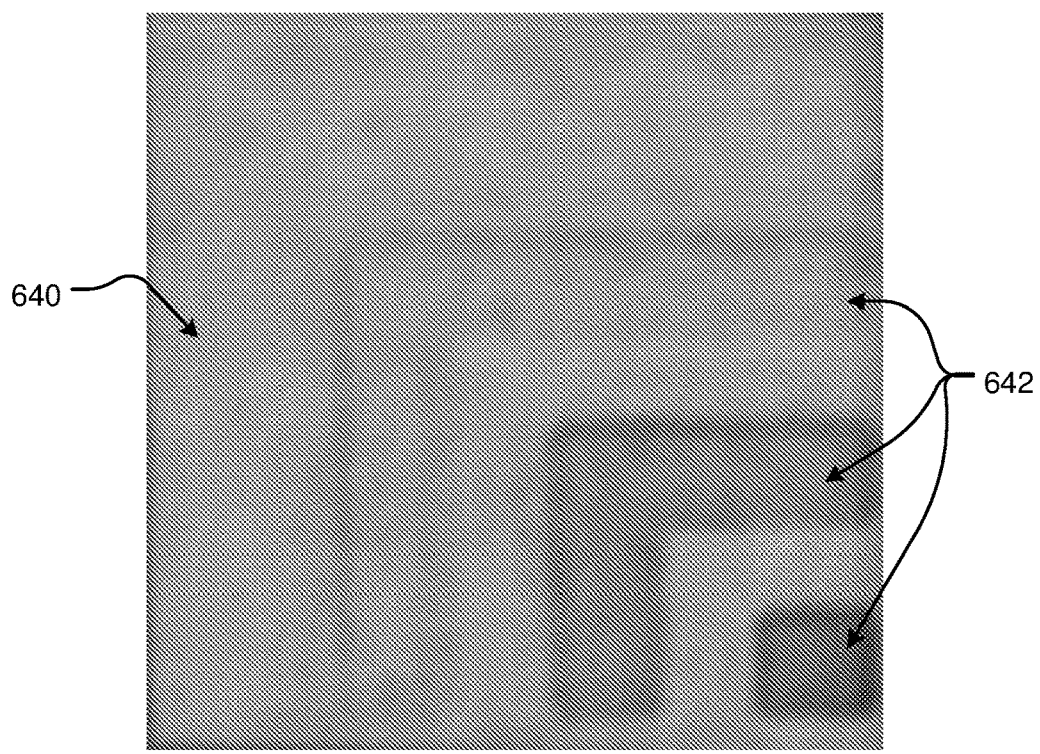
FIG. 6a is a top-view bright-field microscopy image of objects supported on a sample holder, according to an embodiment.
Figure 6B:
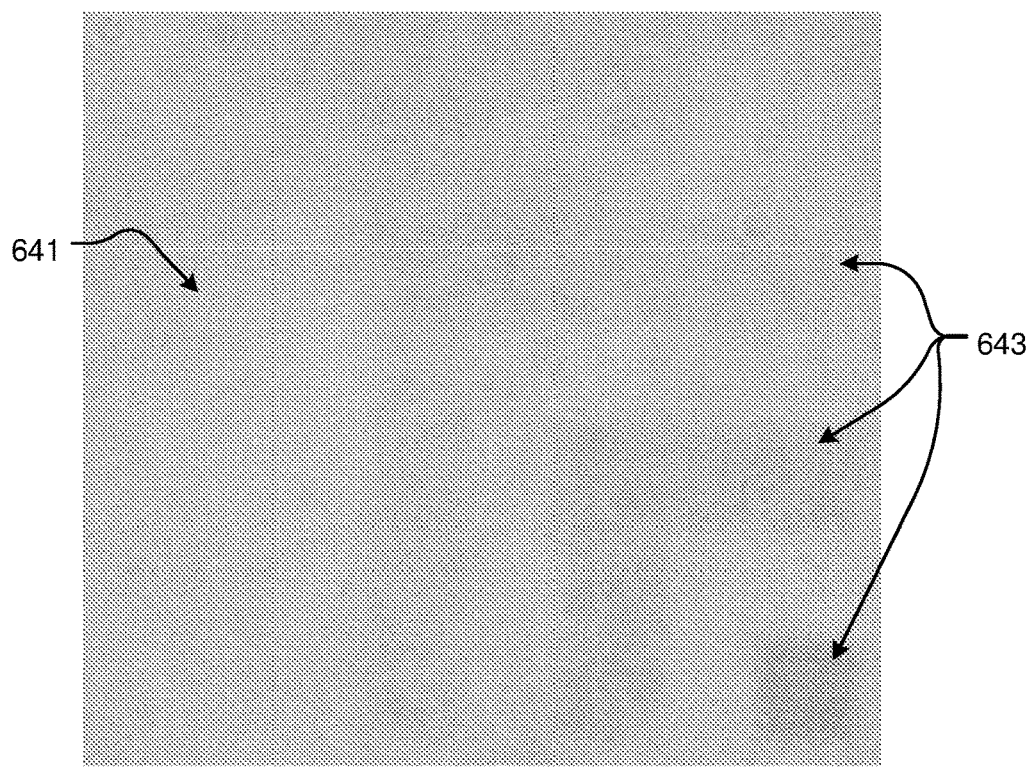
FIG. 6b is a top-view bright-field microscopy image of the objects of FIG. 6a supported on a conventional microscope slide.

In an exemplary embodiment, a sample holder 400 includes an optically clear substrate 410 formed from a conventional glass microscope slide with a plasmonic layer 420 formed from a layer of silver about 150 nm thick. The plasmonic layer 420 defines a periodic triangular array of circular apertures about 160 nm in diameter separated by about 200 nm. The sample holder 400 further includes an optically clear protective layer 430 of amorphous silicon dioxide of about 10 nm thickness. In this configuration, the spectrum 200 from transmitted light 160 transmitted through the sample holder 400 includes an intrinsic surface plasmon resonance peak 220 in the visible spectrum with a resonant wavelength at about 500 nm (green light). Performing method 500 using sample holder 400 in an optical microscope in the brightfield configuration, it was observed that an object 640 consisting of a layer of Pt/C material that is about 3 nm thick, produced adequate image contrast so that it was readily discernible (FIG. 6a). However, the same object 640 seen on a plain glass microscope slide in region 641 was not easily observable using conventional brightfield optical microscopy (FIG. 6b).

FIG. 6a also shows that progressively thicker objects 642 show greater image contrast due to greater wavelength shift. Objects 642 have thicknesses of about 8, 13 and 19 nm. FIG. 6b shows that the same objects 642 on a glass slide as seen in regions 643 also show greater image contrast but the image contrast is not as much as that observed when on the sample holder 400.

FIG. 9a is a bright-field microscopy image of myelin sheath. The image was obtained using an embodiment of the method of imaging an object 500 with 0° linearly polarised light. FIG. 9b is a bright-field microscopy image of the same area in FIG. 9a using method 500 with 90° linearly polarised light.

FIG. 10a is a bright-field microscopy image showing a top-view of a thin film ion-implanted over several spaced apart regions. The image was obtained using an embodiment of the method of imaging an object 500. FIG. 10b is a conventional a bright-field microscopy image of a thin film ion-implanted over several spaced apart regions supported on a conventional microscope slide.

Figure 11A:
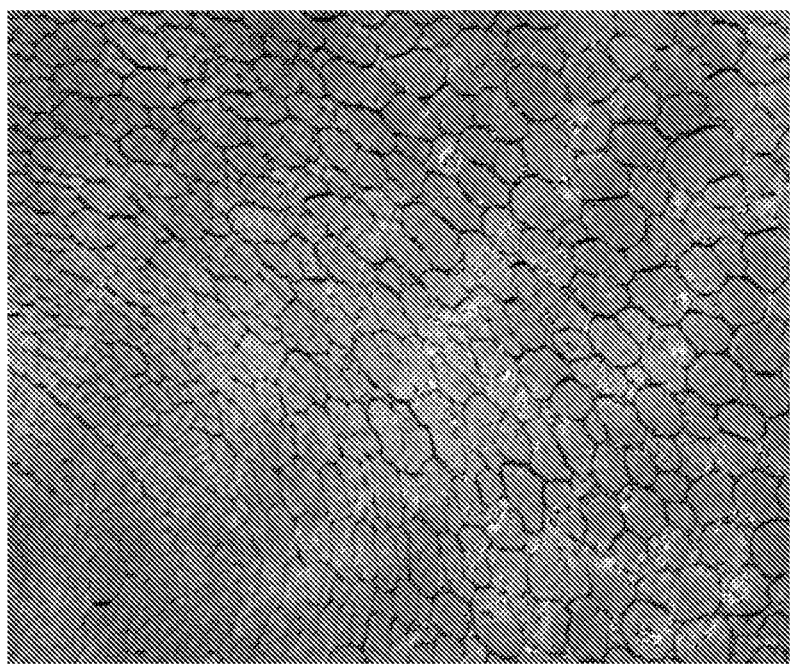
FIG. 11a is a bright-field microscopy image of a cross-section of a plant ovary supported on a sample holder according to an embodiment.
Figure 11B:
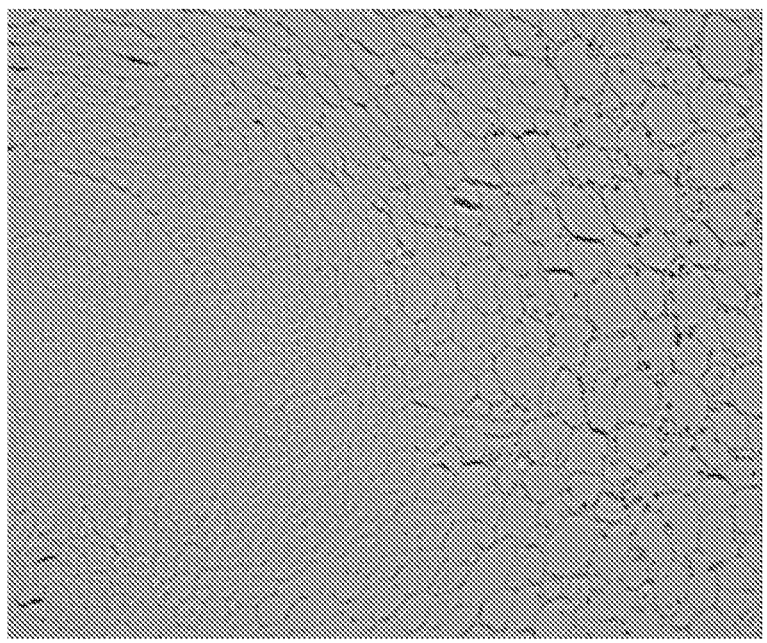
FIG. 11b is a bright-field microscopy image of a cross-section of a plant ovary supported on a conventional microscope slide.

FIG. 11a is a bright-field microscopy image of a cross-section of a plant ovary obtained using an embodiment of the method of imaging an object 500. FIG. 11b is a conventional a bright-field microscopy image of a cross-section of a plant ovary supported on a conventional microscope slide.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of imaging an object comprising:
   supporting the object on a plasmonic layer of a sample holder, wherein the plasmonic layer defines a periodic array of sub-micron structures adjacent the object;
   exposing the sample holder to light such that:
      a first portion of the light is transmitted through either: (i) the plasmonic layer but not the object, or (ii) the plasmonic layer and a first section of the object; and
      a second portion of the light is transmitted through the plasmonic layer and at least a second section of the object;
   wherein the light interacts with at least the plasmonic layer such that:
      the first portion of the transmitted light is characterised by one or more first surface plasmon resonance peaks, and
      the second portion of the transmitted light is characterised by one or more second surface plasmon resonance peaks that are wavelength shifted from the first surface plasmon resonance peaks as a result of the object affecting plasmons propagating within the plasmonic layer; and
   constructing an image of the object from the first and the second portions of the transmitted light to thereby enable the object to be spatially resolved.

2. The method of claim 1, further including analyzing the image to spatially resolve the object.

3. The method of claim 1, wherein the light has a plurality of wavelengths in the range of 200 nm to 900 nm.

4. The method of claim 1, wherein at least one of the first and the second surface plasmon resonance peaks have a peak intensity at a wavelength in the range of 300 nm to 800 nm.

5. The method of claim 1, wherein the sub-micron structures are at least one of:
   arranged in a periodic array with a separation between the sub-micron structures in the range of 200 nm to 500 nm;
   formed having a largest dimension in the range of 50 nm to 300 nm; or
   formed as apertures through the plasmonic layer.

6. The method of claim 5, wherein the apertures are shaped as any one or more of: a circle, a torus, an ellipse, a cross, and a shape including a plurality of intersecting elongate arms.

7. The method of claim 6, wherein an angle between adjacent elongate arms is in a range of 30° to 90°.

8. The method of claim 1, further including exposing the sample holder and the object to polarised light.

9. The method of claim 8, wherein the polarised light is linearly polarised at a first polarisation angle with respect to a first axis of the periodic array of apertures, the periodic array having a first spacing of the sub-micron structures along the first axis that is different to a second spacing of sub-micron structures along a second axis, and the second axis being oriented at an angle to the first axis.

10. The method of claim 9, further including exposing the sample holder and object to linearly polarised light at a second polarisation angle with respect to the first axis.

11. The method of claim 1, performing the method using an optical microscope.

12. The method of claim 1, wherein the plasmonic layer is formed from one or more metals selected from any one of: Al, Ag, Au, Ni, Pt and Pd.

13. The method of claim 1, wherein the plasmonic layer has a thickness in the range of 20 nm to 300 nm.

14. The method of claim 1, wherein the sample holder includes a substrate connected to at least a portion of a first surface of the plasmonic layer to provide mechanical support for the plasmonic layer.

15. The method of claim 14, wherein the substrate is optically clear such that optical transmission through the substrate is greater than zero and the substrate chemically isolates the first surface.

16. The method of claim 1, wherein the sample holder includes an optically clear protective layer bonded to a second side of the plasmonic layer to isolate the plasmonic layer.

17. The method of claim 16, wherein the optically clear protective layer includes at least one of:
- a thickness less than 150 nm;
- a thickness less than 80 nm; or
- any one or more of: silicon oxide, silicon nitride, transparent metal oxide, and a polymer.

18. The method of claim 1, wherein either the object comprises a uniform thickness and/or density, or the object comprises a non-uniform thickness and/or density.

19. A sample holder for use in an optical microscope, the sample holder comprising:
- a plasmonic layer defining a periodic array of sub-micron structures; and
- wherein the sample holder is configured to:
  - support an object such that the periodic array of sub-micron structures is adjacent the object when supporting the object; and
  - enable light to be transmitted through the plasmonic layer, wherein the light interacts with at least the plasmonic layer such that spectra from the transmitted light include:
    - a first portion characterised by one or more first surface plasmon resonance peaks; and
    - a second portion characterised by one or more second surface plasmon resonance peaks that are wavelength shifted from the first surface plasmon resonance peaks as a result of the object affecting plasmons propagating within the plasmonic layer, thereby enabling an image of the object to be constructed from the transmitted light and the object to be spatially resolved from the image.

20. The sample holder of claim 19, wherein the plasmonic layer is configured to produce at least one surface plasmon resonance peak with a peak intensity at a wavelength in the range of 300 nm to 800 nm.

21. The sample holder of claim 19, wherein the sub-micron structures are at least one of:
- arranged in a periodic array with a separation between the sub-micron structures in the range of 200 nm to 500 nm;
- formed to have a largest dimension in the range of 50 nm to 300 nm; or
- formed as apertures through the plasmonic layer.

22. The sample holder of claim 21, wherein the apertures are shaped as any one or more of: a circle, a torus, an ellipse, a cross, and a shape including a plurality of intersecting elongate arms.

23. The sample holder of claim 22, wherein an angle between adjacent arms is in the range of 30° to 90°.

24. The sample holder of claim 19, wherein the plasmonic layer includes at least one of:
- one or more metals selected from the group of: Al, Ag, Au, Ni, Pt and Pd; or
- a thickness in the range of 20 nm to 300 nm.

25. The sample holder of claim 19, further including a substrate connected to at least a portion of a first surface of the plasmonic layer to provide mechanical support for the plasmonic layer.

26. The sample holder of claim 25, wherein optical transmission through the substrate is greater than zero and the substrate chemically isolates the first surface.

27. The sample holder of claim 19, further including an optically clear protective layer on a second side of the plasmonic layer to isolate the plasmonic layer.

28. The sample holder of claim 27, wherein the optically clear protective layer includes at least one of:
- a thickness less than 150 nm;
- a thickness less than 80 nm, or
- any one or more of: silicon oxide, silicon nitride, transparent metal oxide, and a polymer.

* * * * *

UNITED STATES PATENT AND TRADEMARK OFFICE
CERTIFICATE OF CORRECTION

PATENT NO. : 11,506,881 B2
APPLICATION NO. : 16/615782
DATED : November 22, 2022
INVENTOR(S) : Eugeniu Balaur et al.

It is certified that error appears in the above-identified patent and that said Letters Patent is hereby corrected as shown below:

On the Title Page

Item (54), Line 1, "OF" should be --FOR--.

In the Specification

Column 1, Line 1, "OF" should be --FOR--.

Signed and Sealed this
Seventeenth Day of January, 2023

Katherine Kelly Vidal
*Director of the United States Patent and Trademark Office*